(12) United States Patent
Nakamura et al.

(10) Patent No.: US 8,509,689 B2
(45) Date of Patent: Aug. 13, 2013

(54) COMMUNICATION DEVICE AND COMMUNICATION METHOD

(75) Inventors: Masahito Nakamura, Niigata-Ken (JP); Daichi Inoue, Niigata-Ken (JP)

(73) Assignee: Alps Electric Co., Ltd., Tokyo (JP)

( * ) Notice: Subject to any disclaimer, the term of this patent is extended or adjusted under 35 U.S.C. 154(b) by 417 days.

(21) Appl. No.: 12/841,579

(22) Filed: Jul. 22, 2010

(65) Prior Publication Data

US 2011/0021148 A1   Jan. 27, 2011

(30) Foreign Application Priority Data

Jul. 22, 2009   (JP) ................................ 2009-171084

(51) Int. Cl.
*H04B 7/00*   (2006.01)
(52) U.S. Cl.
USPC ... 455/41.2; 455/41.1; 455/11.11; 455/115.3; 455/100; 455/127.1; 455/80; 340/539.12; 340/333; 340/825.72; 381/71.6; 381/315; 607/32; 607/60
(58) Field of Classification Search
USPC ............... 455/41.2, 11.11, 41.1, 100, 115.3, 455/127.1, 80; 340/539.1, 333; 381/315, 381/71.6; 607/32, 60
See application file for complete search history.

(56) References Cited

U.S. PATENT DOCUMENTS

| | | | |
|---|---|---|---|
| 5,204,672 A | | 4/1993 | Brooks |
| 5,796,827 A | * | 8/1998 | Coppersmith et al. ........ 713/182 |
| 5,914,701 A | | 6/1999 | Gersheneld et al. |
| 6,211,799 B1 | * | 4/2001 | Post et al. ........................ 341/33 |
| 6,771,161 B1 | * | 8/2004 | Doi et al. ..................... 340/5.64 |
| 6,853,091 B2 | | 2/2005 | Miyajima |
| 6,864,780 B2 | * | 3/2005 | Doi et al. ..................... 340/5.64 |
| 7,443,290 B2 | * | 10/2008 | Takiguchi ................... 340/539.1 |
| 7,480,492 B2 | * | 1/2009 | Williams et al. .............. 455/100 |
| 7,531,939 B2 | * | 5/2009 | Takiguchi ..................... 310/318 |
| 7,557,712 B2 | * | 7/2009 | Shelton et al. .............. 340/572.4 |
| 7,583,930 B2 | * | 9/2009 | Minotani et al. ............. 455/41.1 |
| 7,664,476 B2 | * | 2/2010 | Yanagida ................... 455/188.1 |
| 7,750,851 B2 | * | 7/2010 | Washiro ................. 343/700 MS |
| 7,801,483 B2 | * | 9/2010 | Minotani et al. ............. 455/41.1 |
| 7,978,063 B2 | * | 7/2011 | Baldus et al. ............ 340/539.12 |

(Continued)

FOREIGN PATENT DOCUMENTS

| | | |
|---|---|---|
| EP | 0 843 425 A2 | 5/1998 |
| EP | 0 843 425 A3 | 12/2000 |

(Continued)

OTHER PUBLICATIONS

Extended European Search Report issued in corresponding European Patent Application No. 10169881.9, mailed Nov. 30, 2010.

*Primary Examiner* — Marceau Milord
(74) *Attorney, Agent, or Firm* — Brinks Hofer Gilson & Lione

(57) ABSTRACT

A communication device for communicating with an external device using a human body as a signal transmission path, includes an electric field strength measuring unit configured to measure a noise level from a detected received electric field strength at the time of no signal after the received electric field strength is detected by the communication device when a transmission signal to be output to the external device is absent, a transmission output determination unit configured to determine an output level of the transmission signal to be transmitted to the external device on the basis of the measured noise level, and an output execution unit configured to output a transmission signal of the determined output level to the external device.

8 Claims, 9 Drawing Sheets

(56) References Cited

U.S. PATENT DOCUMENTS

| | | | |
|---|---|---|---|
| 8,013,795 B2 * | 9/2011 | Washiro | 343/700 MS |
| 8,064,953 B2 * | 11/2011 | Williams et al. | 455/556.1 |
| 8,180,288 B2 * | 5/2012 | Hebiguchi et al. | 455/41.1 |
| 8,224,244 B2 * | 7/2012 | Kim et al. | 455/41.1 |
| 8,270,902 B2 * | 9/2012 | Hasegawa et al. | 455/41.1 |
| 8,271,093 B2 * | 9/2012 | Von Arx et al. | 607/60 |
| 8,280,302 B2 * | 10/2012 | Kubono et al. | 455/41.1 |
| 8,314,619 B2 * | 11/2012 | Takiguchi | 324/530 |
| 8,331,859 B2 * | 12/2012 | Maekawa | 455/41.1 |

FOREIGN PATENT DOCUMENTS

| | | |
|---|---|---|
| EP | 1 598 965 A1 | 11/2005 |
| JP | 2007020124 | 1/2007 |
| JP | 2007226560 | 9/2007 |

\* cited by examiner

COMMUNICATION DEVICE AND COMMUNICATION METHOD

CROSS REFERENCE TO RELATED APPLICATIONS

The present invention contains subject matter related to and claims priority to Japanese Patent Application JP 2009-171084 filed in the Japanese Patent Office on Jul. 22, 2009, the entire contents of which being incorporated herein by reference.

BACKGROUND

1. Technical Field

The present disclosure relates to a communication device and a communication method which perform communication using electric field coupling.

2. Related Art

In general, RFID (Radio Frequency IDentification), infrared communication, and short-range radio communication schemes besides wired communication for a system having a communication device are known. Since non-contact communication by radio waves or the like is possible, the non-contact communication is utilized in various places, for example, such as an event site and a station ticket gate.

On the other hand, since devices using radio waves are regulated by law and are easily affected by interference or obstruction from peripheral devices, the techniques of new communication schemes using electric field coupling have been disclosed (for example, see Japanese Patent No. 4074661 and Japanese Unexamined Patent Application Publication No. 2004-153708). When a human body is used for a signal transmission path, external leaking may be difficult as compared to radio waves or the like, and the performance of communication may be improved by control of an output level of a transmission signal.

However, even though the communication scheme uses the above-described electric field coupling, the communication performance thereof is affected by environmental noise (external noise generated by a peripheral device, noise of a power supply system, or the like). When a noise level is high, a transmission signal may be buried in the environmental noise. Therefore, there is a problem in that communication performance may be degraded.

In this case, an output level of the transmission signal may be set to be higher than the noise level. However, when the output level is set to be high, there is a problem in that a radiated electric field becomes excessively strong and communication is performed even though it is not immediately before a human body is in contact with a receiver, or a transmitter and a receiver directly communicate beyond the human body, thereby establishing communication without passing through the human body in spite of the human body being used for a signal transmission path.

In the case where the transmitter is a portable device which is driven by a battery, there is a problem in that the battery life is shortened when the output level of the transmission signal is set to be simply high.

Here, in terms of solutions of these problems, it should be noted that the human body itself is affected by environmental noise. This is because the human body itself which is the signal transmission path functions as an antenna and easily picks up the environmental noise.

That is, when the environmental noise received by the human body is not recognized, the improvement of true communication performance may not be achieved even though it is possible to set an output level of a transmission signal on the basis of a noise level.

SUMMARY

According to a first embodiment, there is provided a communication device for communicating with an external device using a human body as a signal transmission path, including: an electric field strength measuring unit configured to measure a noise level from a detected received electric field strength at the time of no signal after the received electric field strength is detected by the communication device when a transmission signal to be output to the external device is absent; a transmission output determination unit configured to determine an output level of the transmission signal to be transmitted to the external device on the basis of the measured noise level; and an output execution unit configured to output a transmission signal of the determined output level to the external device.

According to the first embodiment of the invention, the communication device includes the electric field strength measuring unit, the transmission output determination unit, and the output execution unit.

According to a second embodiment, the received electric field strength at the time of no signal may be a received electric field strength at the moment when the human body is in contact with the external device in a state in which the transmission signal directed to the external device is not started up.

DESCRIPTION OF EXEMPLARY EMBODIMENTS

Hereinafter, preferred embodiments of the present invention will be described on the basis of the drawings.

Figure 1:
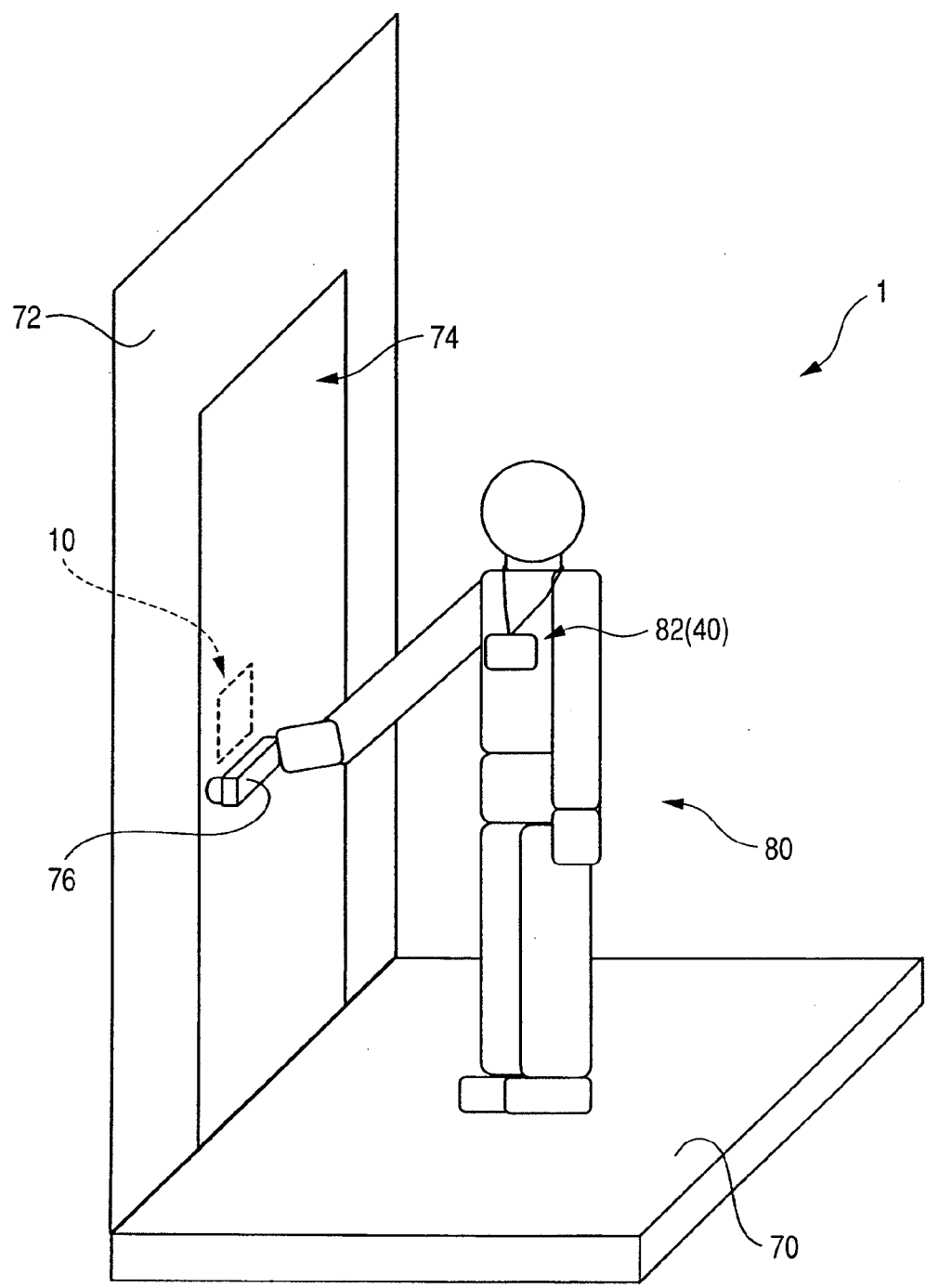
FIG. 1 is a system configuration diagram of the first and second communication modules according to an embodiment.

For example, a communication system 1 of an embodiment shown in FIG. 1 is constructed between a door 74 of a building and an employee ID card 82 attached to a human body 80.

This building internally has a plurality of rooms and the rooms neighboring each other are divided by a wall 72.

When the human body 80 of FIG. 1 moves from a room having a floor surface 70 to a neighboring room, the door 74 is used. The door 74 of this embodiment is rotatably supported on the wall 72 via a hinge, thereby opening/closing a part of the wall 72.

A rotatably supported door knob 76 is provided in an appropriate position of the front side of the door 74. As shown in FIG. 1, the knob 76 extends in a substantially horizontal direction along the front side of the door 74 in a state in which the door 74 is closed.

The motion of the door knob 76 interlocks with a latch bolt provided on an end face of the door 74. In detail, when the door knob 76 is grabbed by the hand of the human body 80, and is rotated, for example, in a clockwise direction, as viewed from the human body 80, the tip end of the latch bolt recedes to be substantially flush with the end face of the door 74. Thereby, the temporary tightening of the door 74 is loosened, and the door 74 is rotatable toward the room having the floor surface 70 or toward its neighboring room, and the human body 80 is able to move from the room having the floor surface 70 to the neighboring room.

On the other hand, when the hand of the human body 80 is separated from the door knob 76, the knob 76 returns to a position shown in FIG. 1 by the urging force of a spring. Since the latch bolt is projected from the end face of the door 74, it is possible to temporarily tighten the door 74.

Further, in the end face of the door 74, a dead bolt is provided in the vicinity of the latch bolt.

The dead bolt has a main tightening function of the door 74. In a state in which the door 74 is locked, the dead bolt is projected from the end face of the door 74, and is solidly engaged to the wall 72. On the other hand, since the tip end of the dead bolt is substantially flush with the end face of the door 74 when the door 74 is unlocked, the main tightening of the door 74 is loosened and a temporarily tightened state is formed by the above-described latch bolt.

Here, in this embodiment, the door 74 is locked or unlocked by communication using electric field coupling.

Specifically, as shown in FIG. 1, a first communication module (communication device) 10 is embedded in the vicinity of the door knob 76 on an inner side of the door 74, and a second communication module (external device) 40 which is driven by a battery is provided on an employee ID card 82 suspended from the neck of the human body 80.

The first communication module 10 authenticates a unique ID (identification signal) of the second communication module 40, and locks or unlocks the door 74.

Figure 2:
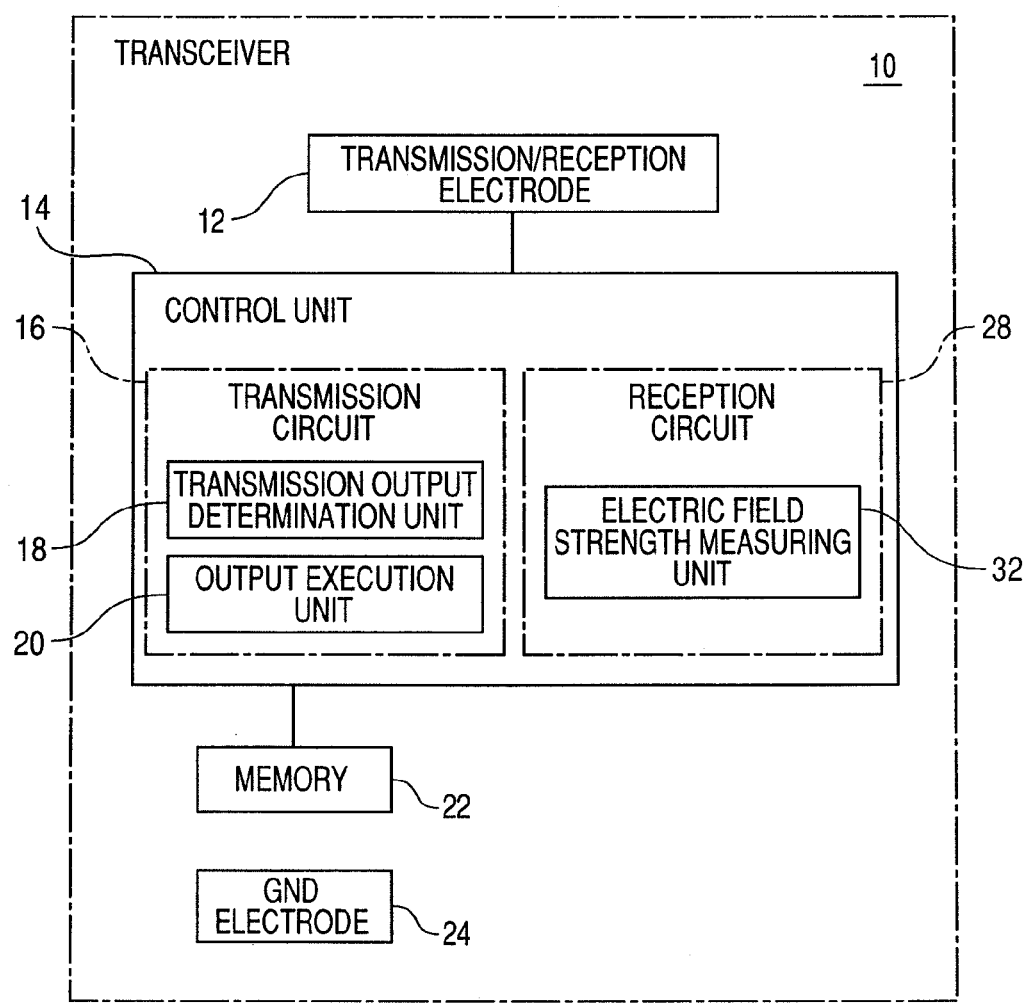
FIG. 2 is a schematic configuration diagram of the first communication module of FIG. 1.

In more detail, the first communication module 10 is a transceiver, and includes a transmission/reception electrode 12 for human body communication and a GND electrode 24 as shown in FIG. 2. The transmission/reception electrode 12 is arranged in the vicinity of the surface of the door knob 76 which is capable of contacting the hand of the human body 80. The GND electrode is the GND of a circuit board and a GND portion extended from the GND of the circuit board.

On the other hand, the GND electrode 24 is arranged in an appropriate position on a far side from the human body 80 by interposing the transmission/reception electrode 12.

The transmission/reception electrode 12 is electrically connected to a control unit 14. Specifically, the control unit 14 includes a transmission circuit 16 and a reception circuit 28. For example, the transmission circuit 16 outputs a transmission signal to the transmission/reception electrode 12 in a fixed interrupt cycle, and drives the transmission/reception electrode 12 by generating a potential signal at the time.

On the other hand, a reception signal from the transmission/reception electrode 12 is input to the reception circuit 28 in a fixed interrupt cycle. The transmission signal and the reception signal are alternately generated.

Figure 4:
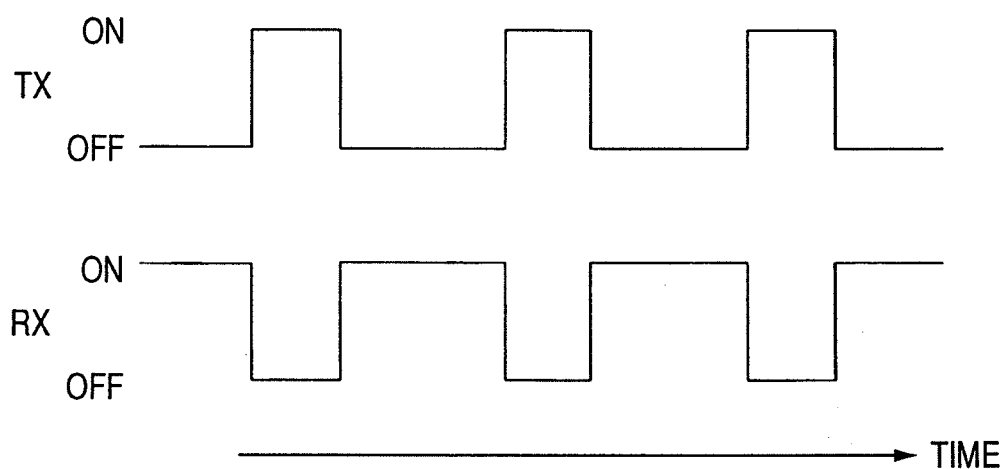
FIG. 4 is a diagram illustrating signals transmitted to and received from the first communication module of FIG. 2.

For example, as shown in FIG. 4, when the transmission circuit TX is not started up, the reception circuit RX is started up. Next, when the transmission circuit TX is started up, the reception circuit RX is shut down.

That is, the reception circuit RX is started up in an interval (when no transmission signal is present) between the start-up transmission circuit TX and the next start-up transmission circuit TX.

The transmission/reception electrode 12 detects a received electric field strength in the above-described interval, and outputs the detection result to the reception circuit 28.

Here, a received electric field strength of this embodiment and a noise level of environmental noise received by the human body 80 are in a substantially proportional relationship.

Figure 5:
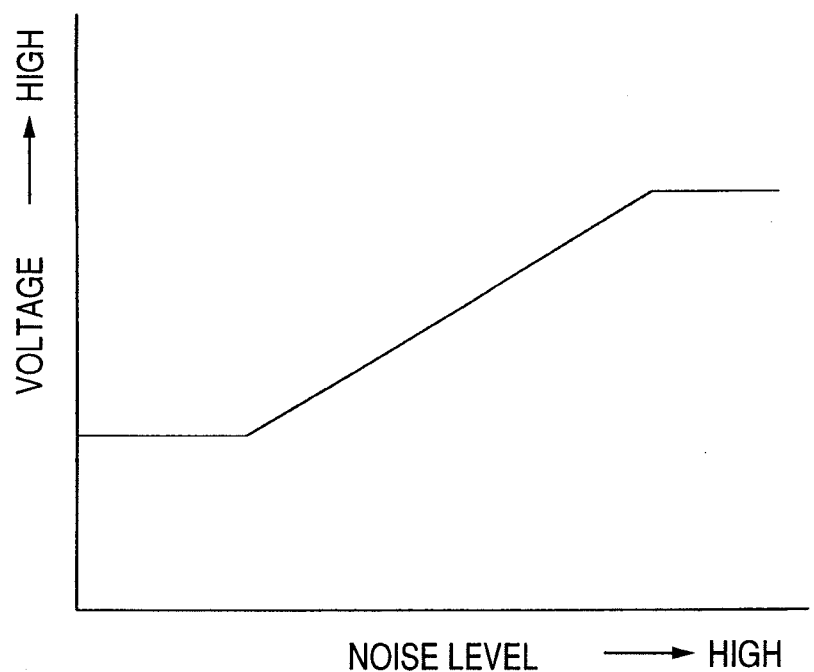
FIG. 5 is a diagram illustrating a noise level of the first communication module of FIG. 2.

Specifically, as shown in FIG. 5, when a voltage value of a received electric field strength RSSI (Received Signal Strength Indication) is taken on the vertical axis and a level of a signal input to the first communication module 10 is taken on the horizontal axis, it can be seen that the level of the signal input to the communication module 10 also becomes high as the received electric field strength becomes high.

Since the received electric field strength is detected when the transmission signal is not started up as described above, the received electric field strength detected by the communication module 10 corresponds to the noise level of environmental noise received by the human body 80.

For example, a communication distance by this embodiment is a short distance corresponding to PAN (Personal Area Network) or BAN (Body Area Network), and the communication modules 10 and 40 are in substantially the same environment. That is, the noise level received by the communication module 10 is substantially the same as the noise level received by the second communication module 40.

In a state in which the transmission signal is not started up, a value of the received electric field strength of this embodiment is detected by the transmission/reception electrode 12 at the moment when the hand of the human body 80 is in contact with the door knob 76, and is output to an electric field strength measuring unit 32. The moment when the hand is in contact with the door knob 76 not only corresponds to a point in time when the hand of the human body 80 is actually in contact with the door knob 76, but also corresponds to a point in time immediately before the hand is in contact with the door knob 76.

That is, the electric field strength measuring unit 32 is able to constantly measure a noise level of common environmental noise between the communication modules 10 and 40, but a noise level of environmental noise to be particularly measured becomes a particularly high noise level in environmental noise picked up by the human body 80.

The transmission circuit 16 of this embodiment has a transmission output determination unit 18 or an output execution unit 20. The transmission output determination unit 18 determines an output level of a transmission signal on the basis of a noise level measured by the electric field strength measuring unit 32. The output execution unit 20 outputs a transmission signal of the determined output level to the second communication module 40.

The output execution unit 20 also outputs information (for example, an index of level 4 or the like) of the noise level measured by the electric field strength measuring unit 32 or the output level determined by the transmission output determination unit 18 to the second communication module 40.

The first communication module 10 further includes a memory 22. The memory 22 stores a unique ID of the module 10.

Figure 3:
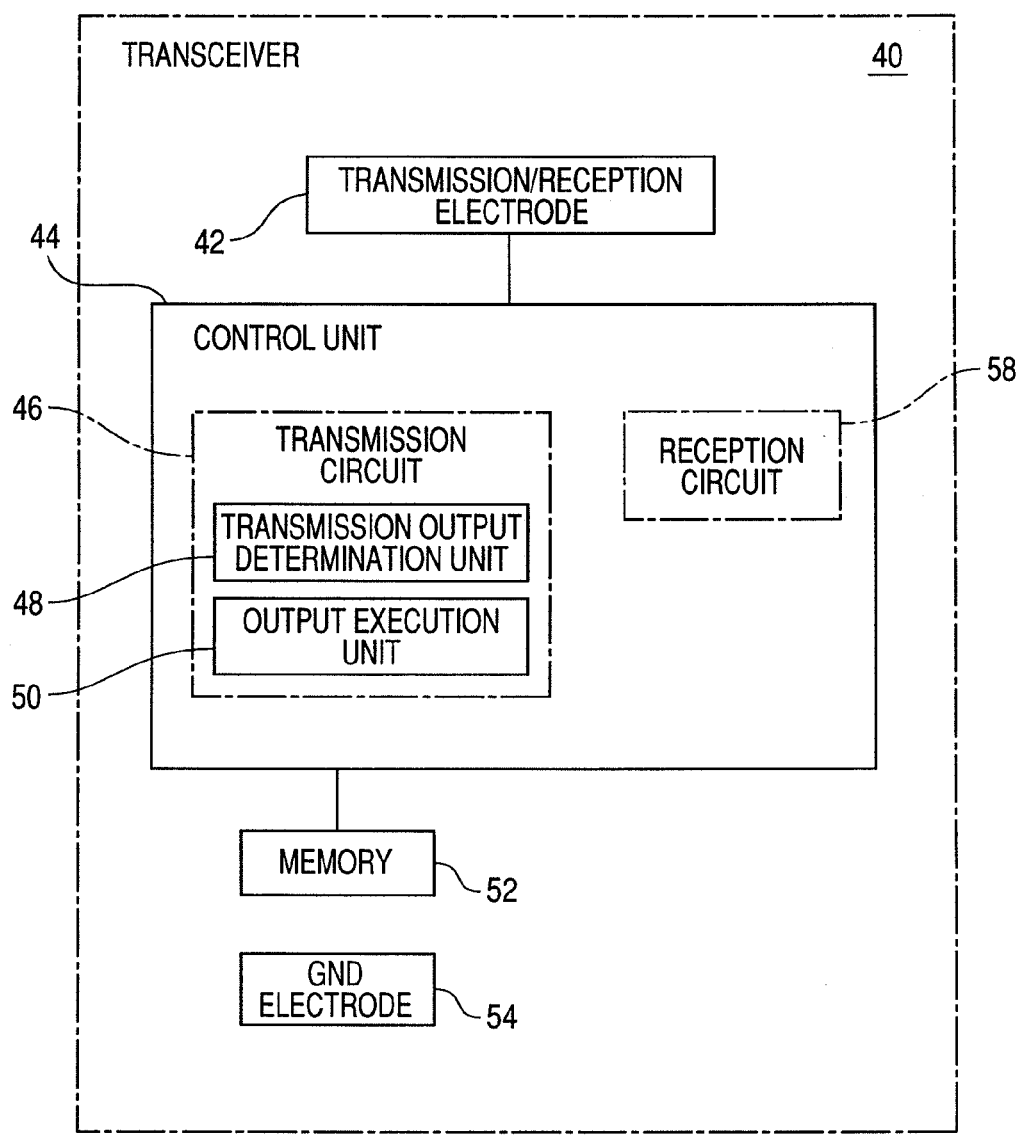
FIG. 3 is a schematic configuration diagram of the second communication module of FIG. 1.

On the other hand, the second communication module 40 is also a transceiver, and includes a transmission/reception electrode 42 for human body communication and a GND electrode 54 as shown in FIG. 3. The transmission/reception electrode 42 is arranged on the backside of the employee ID card 82 facing clothing of the human body 80.

On the other hand, for example, the GND electrode 54 is arranged in an appropriate position of the surface of the employee ID card 82 to which a photo or the like is attached.

The transmission/reception electrode 42 is electrically connected to a control unit 44. The control unit 44 includes a transmission circuit 46 and a reception circuit 58. For example, a received signal from the transmission/reception electrode 42 is input to the reception circuit 58 in a fixed interrupt cycle. For example, the transmission circuit 46 outputs a transmission signal to the transmission/reception electrode 42 in a fixed interrupt cycle, and drives the transmission/reception electrode 42 by generating a potential signal at the time.

The received signal of this embodiment is a signal obtained by demodulating the unique ID of the first communication module 10 and the information of the noise level of the environmental noise picked up by the human body 80 and measured by the electric field strength measuring unit 32 or the output level after the determination by the transmission output determination unit 18.

Here, the transmission level 46 also includes a transmission output determination unit 48 and an output execution unit 50. The transmission output determination unit 48 uses the information of the noise level of the environmental noise picked up by the human body 80 and measured by the electric field strength measuring unit 32 or the output level after the determination by the transmission output determination unit 18. In detail, the transmission output determination unit 48 determines an output level of a transmission signal to be returned to the communication module 10 on the basis of the measured noise level or the determined output level.

The output execution unit 50 outputs a transmission signal of the determined output level to the first communication module 10.

The second communication module 40 also includes a memory 52. The memory 52 stores a unique ID of the module 40.

When the control unit 14 of the first communication module 10 has determined that the ID is normal, the second communication module 40 is specified and the door 74 is unlocked.

Figure 6:
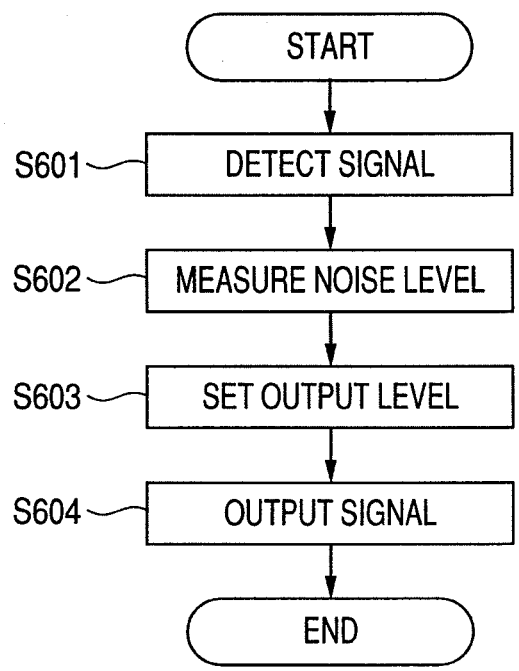
FIG. 6 is an operation flowchart until a signal is output by the first communication module of FIG. 2.
Figure 7:
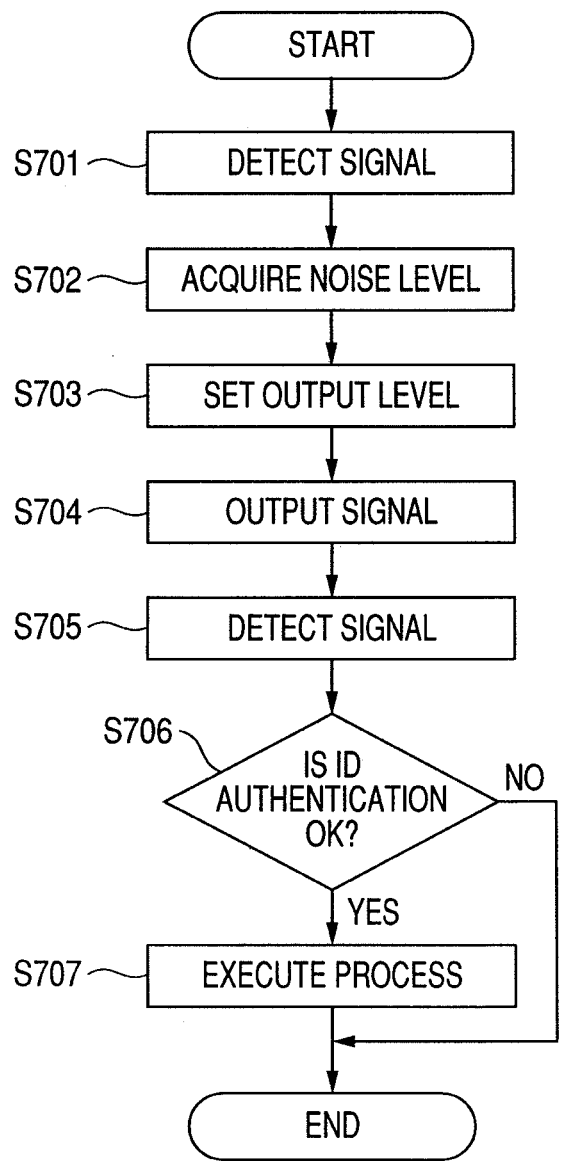
FIG. 7 is an operation flowchart until a signal is output by the second communication module of FIG. 3 and until a process is executed by the first communication module of FIG. 2.

Referring to FIGS. 6 and 7, an operation flowchart of communication in which the human body 80 is set as a signal transmission path by the first communication module 10 and the second communication module 40 is shown. Hereinafter, the operation according to an embodiment of the present invention of the above-described communication system 1 will be described.

First, in a state in which the door 74 is locked until the first communication module 10 outputs a transmission signal to the second communication module 40 as shown in FIG. 6, step S601 of FIG. 6 is when no transmission signal is present in the first communication module 10, that is, a reception state in which the reception circuit RX is started up to detect a signal.

In this embodiment, the transmission/reception electrode 12 detects a received electric field strength at the moment when the hand of the human body 80 is in contact with the door knob 76. Then, the process proceeds to step S602.

In step S602, the electric field strength measuring unit 32 measures a noise level of environmental noise picked up by the human body 80 from the received electric field strength of the above-described moment, and outputs the measurement result to the transmission output determination unit 18. Then, the process proceeds to step S603.

The transmission output determination unit 18 determines a transmission signal directed to the second communication module 40 as a high output level when the measured noise level is high, and determines the transmission signal as a low output level when the measured noise level is low.

Next, the transmission output determination unit 18 outputs the determination result to the output execution unit 20. Then, the process proceeds to step S604. The output execution unit 20 outputs a transmission signal of the output level after the determination which is a transmission signal in which information of the noise level measured by the electric field strength measuring unit 32 or the output level after the determination by the transmission output determination unit 18 is added to the unique ID of the communication module 10.

Subsequently, the transmission circuit 16 converts the transmission signal into an electric signal, and the control unit 14 modulates the signal. It escapes from the series of routines by outputting the signal to the second communication module 40 via the transmission/reception electrode 12.

Here, assuming that the control unit 14 has applied a positive charge voltage to the transmission/reception electrode 12, an electric field occurs in the transmission/reception electrode 12. The transmission signal from the transmission/reception electrode 12 reaches the hand of the human body 80 in contact with the door knob 76. Since the transmission/reception electrode 12 becomes a positive electrode, negative charges are induced on the hand in contact with the door knob 76 (electric field coupling).

Next, positive charges are induced in the vicinity of the employee ID card 82 of the human body 80. As described above, the electric field assigned to the human body 80 is transmitted through its clothing and reaches the second communication module 40.

Subsequently, until the second communication module outputs a transmission signal to the first communication module 10 and the first communication module 10 unlocks the door 74 as shown in FIG. 7, the second communication module 40 is started when the transmission/reception electrode 42 detects the transmission signal from the first communication module 10 in step S701 of FIG. 7.

The reception circuit 58 converts the detected signal into an electrical signal, the control unit 44 demodulates the signal, and the process proceeds to step S702.

In step S702, the transmission output unit 48 acquires information of the noise level of environmental noise picked up by the human body 80 and measured by the electric field strength measuring unit 32 or the output level determined by the transmission output determination unit 18.

Subsequently, the process proceeds to step S703. The transmission output determination unit 48 determines a transmission signal to be returned to the first communication module 10 as a high output level when the measured noise level or the determined output level described above is high, and determines the transmission signal to be returned as a low output level when the measured noise level or the determined output level described above is low. Until the process reaches step S703, the control unit 44 determines whether the received ID is a normal ID. When it is determined that the received ID is the normal ID, the first communication module 10 is specified.

The transmission output determination unit 48 outputs the determination result to the output execution unit 50, and the process proceeds to step S704.

In step S704, the output execution unit 50 outputs a transmission signal of the output level after the determination by the transmission output determination unit 48 in the unique ID of the second communication module 40.

Thereafter, the transmission circuit 46 converts the transmission signal into an electrical signal, and the control unit 44 modulates the signal. The second communication module 40 is in awaiting state when the signal is output to the first communication module 10 via the transmission/reception electrode 42.

Here, assuming that the control unit 44 has applied a positive charge voltage to the transmission/reception electrode 42, an electric field occurs in the transmission/reception electrode 42. The transmission signal from the transmission/reception electrode 42 reaches the vicinity of the employee ID card 82 of the human body 80. Since the transmission/reception electrode 42 becomes a positive electrode, negative charges are induced in the vicinity of the employee ID card 82 (electric field coupling).

Subsequently, positive charges are induced on the hand of the human body 80 in the vicinity of the door knob 76. As described above, an electric field assigned to the human body 80 reaches the first communication module 10.

Next, the electric field assigned to the human body 80 is detected by the transmission/reception electrode 12 of the first communication module 10 (step S705). A signal detected by the transmission/reception electrode 12 is converted into an electrical signal by the reception circuit 28. Then, the process proceeds to step S706.

In step S706, the control unit 14 demodulates the signal and determines whether or not the received ID is a normal ID. When the received ID is the normal ID, that is, the determination result is YES, the process proceeds to step S707. Since the second communication module 40 is specified, the control unit 14 escapes from the series of routines by unlocking the door 74. Thereby, the temporarily tightened state is formed by the above-described latch bolt.

On the other hand, when the received ID is not the normal ID in step S706, the control unit 14 rapidly escapes from the routine and continuously locks the door 74. The dead bolt is continuously solidly engaged to the wall 72.

The electric field coupling from the transmission/reception electrode 12 of the first communication module 10 to the transmission/reception electrode 42 of the second communication module 40 via the human body 80 and the electric field coupling from the transmission/reception electrode 42 of the second communication module 40 to the transmission/reception electrode 12 of the first communication module 10 via the human body 80 serve as signal lines, but the first communication module 10 has a reference line which is electric field coupled to the second communication module 40 via the air or the floor surface 70. The signal lines and the reference line form one closed loop.

That is, the GND electrode 24 of FIG. 2 is electric field coupled to the ground which is the floor surface 70, the GND electrode 54 of FIG. 3 is electric field coupled to the ground which is the floor surface 70, and they become the negative electrode in this embodiment. The electric field coupling from the GND electrode 24 of the first communication module 10 to the GND electrode 54 of the second communication module 40 via the air or the floor surface 70 serves as the reference line.

Incidentally, in the above-described embodiment, an output level of a transmission signal is determined only on the basis of a received electric field strength when no transmission signal of the first communication module 10 is present.

However, in two-way communication in which communication is continued even after ID authentication, an output level of a transmission signal directed to the second communication module 40 may be re-determined by also considering a signal from the second communication module 40.

Figure 8:
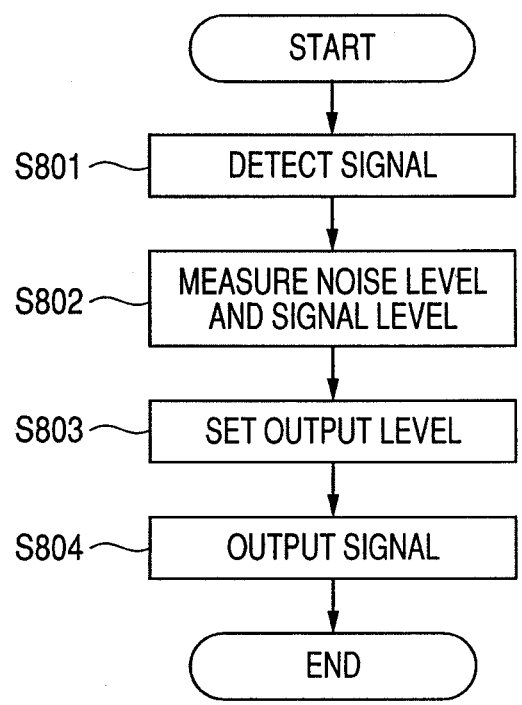
FIG. 8 is an operation flowchart until a signal is output by the first communication module of a second embodiment.

In detail, in communication after the transmission from the first communication module 10 is performed and the transmission from the second communication module 40 is returned (after S704), the transmission/reception electrode 12 detects a received electric field strength even in the example shown in FIG. 8 like the example of FIG. 6 (step S801).

Here, the electric field strength measuring unit 32 measures a noise level of environmental noise picked up by the human body 80 from the above-described received electric field strength and a received signal level of a transmitted signal returned from the second communication module 40 (step S802). The transmission output determination unit 18 determines an output level of a transmission signal to be transmitted to the second communication module 40 (step S803).

Until the process reaches step S803, the control unit 44 determines whether or not the received ID is the normal ID. When it is determined that the received ID is the normal ID, the second communication module 40 is specified.

Subsequently, the transmission output determination unit 18 outputs the determination result to the output execution unit 20. Then, the process proceeds to step S804. The output execution unit 20 outputs a transmission signal of the re-determined output level which is a transmission signal in which information of the noise level measured by the electric field strength measuring unit 32 or the output level after the determination by the transmission output determination unit 18 is added to the unique ID of the module 10.

Thereafter, the control unit 14 escapes from the series of routines by outputting the transmission signal to the second communication module 40 via the transmission/reception electrode 12 as in the above-described embodiment of FIG. 6.

In actual communication, not only the noise level is changed, but also the level of a signal transmitted via the human body is changed by a posture of the human body or a contact method of the transmission/reception electrode. Thus, the output level of the transmission signal first set in step S603 of FIG. 6 also considers a change of a transmission signal level in addition to a level considering the noise level, so that it is necessary to set the output level to be slightly high. However, in two-way communication in which communication is continued even after ID authentication, it is possible to suppress a useless output by determining a transmission output level on the basis of the noise level and the received signal level as shown in FIG. 8.

It is possible to detect the noise level before or after the detection of the received signal level.

On the other hand, an example of two-way communication in each embodiment has been described above, but the present invention is also applicable to other one-way communication.

Figure 9:
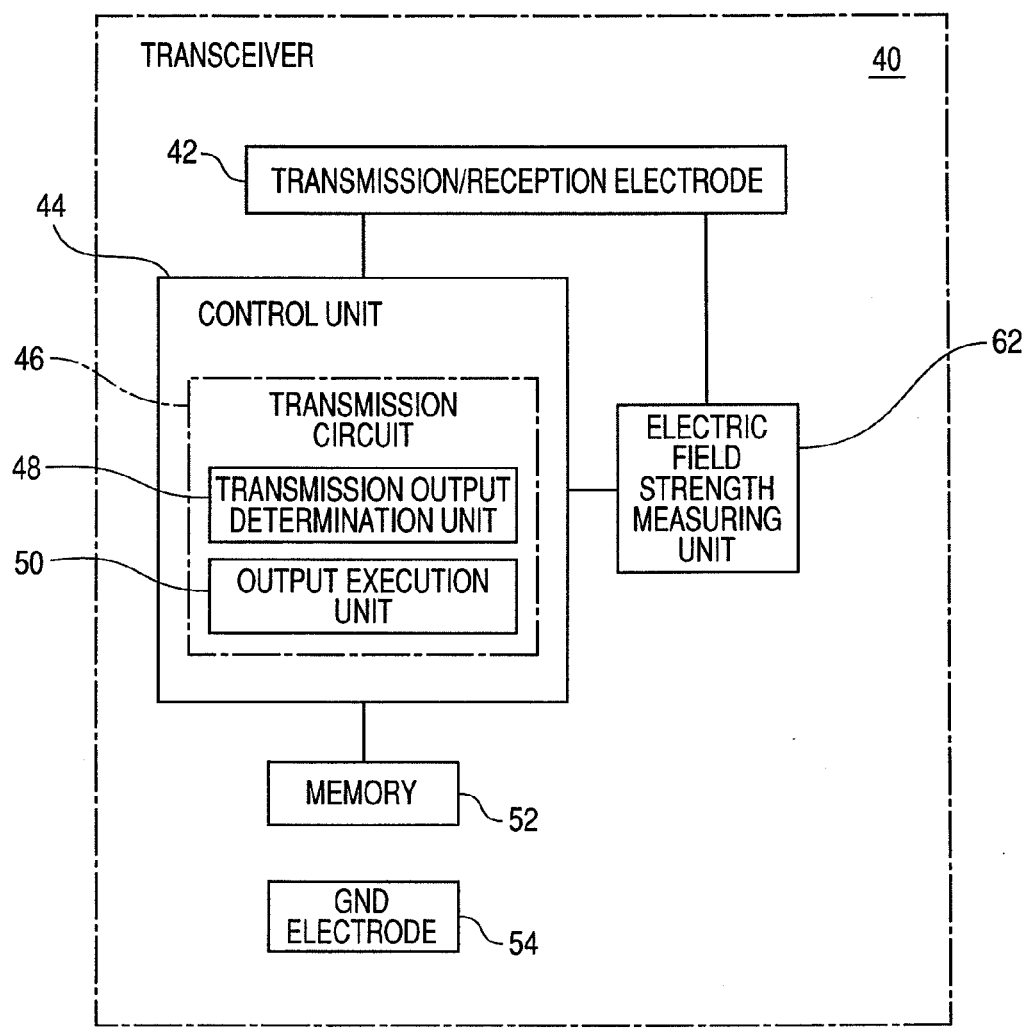
FIG. 9 is a schematic configuration diagram of the second communication module of a third embodiment.
Figure 10:
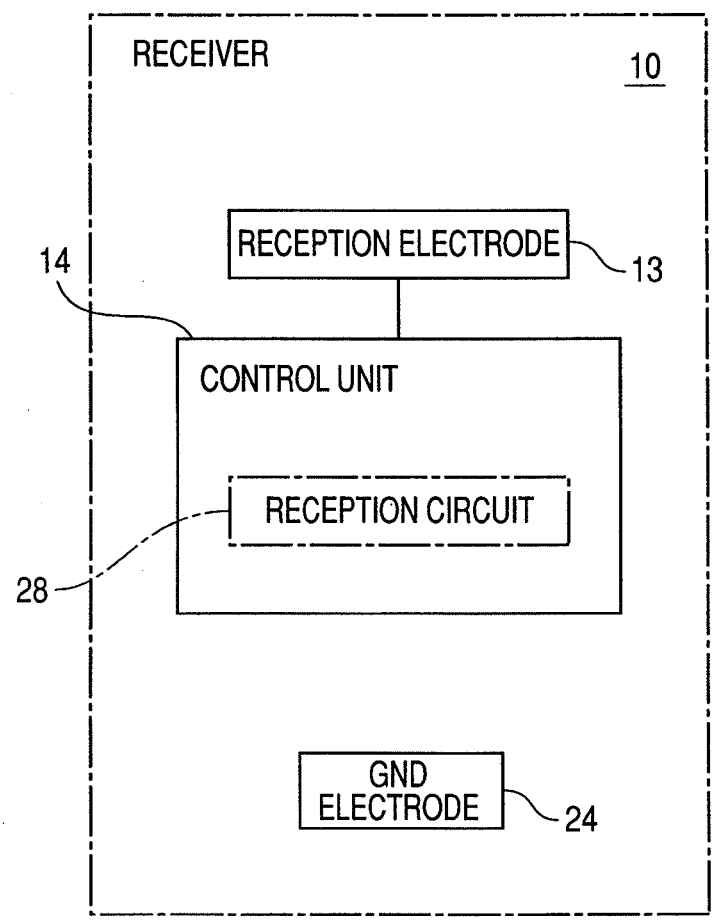
FIG. 10 is a schematic configuration diagram of the first communication module of the third embodiment.

Specifically, an embodiment shown in FIGS. 9 and 10 is communication directed from the second communication module 40 of the employee ID card 82 only to the first communication module 10 of the door 74.

A second communication module 40 of this embodiment is a transmitter, and includes a transmission/reception electrode 42 for human body communication and a GND electrode 54 as shown in FIG. 9. The transmission/reception electrode 42 is arranged on the backside of the employee ID card 82 facing clothing of the human body 80.

The transmission/reception electrode 42 is electrically connected to a control unit 44. The control unit 44 includes a transmission circuit 46. The transmission circuit 46 includes a transmission output determination unit 48 and an output execution unit 50. The transmission output determination unit 48 and the output execution unit 50 have the same function as those of the first communication module 10 of FIG. 2. A memory 52 stores a unique ID of the communication module 40.

Also, the transmission/reception electrode 42 is electrically connected to an electric field strength measuring unit 62. In this embodiment, since a value of the received electric field strength of this embodiment is detected by the transmission/reception electrode 42 in a state in which the transmission circuit of the control unit 44 is not started up and the second communication module 40 is constantly attached to the human body 80, the electric field strength measuring unit 62 measures a noise level of environmental noise picked up by the human body 80.

The measured noise level is output to the transmission output determination unit 48. The transmission output determination unit 48 determines an output level of a transmission signal directed to the communication module 10 by following the measured noise level, and the output execution unit 20 outputs a transmission signal of the determined output level to the first communication module 10.

The transmission circuit 46 converts the transmission signal of the output level after the determination as a transmission signal of a unique ID of the communication module 40 into an electrical signal. The control unit 44 modulates the transmission signal, outputs the modulated transmission signal to the transmission/reception electrode 42, and causes the output modulated transmission signal to reach the first communication module 10. The operation by the second communication module 40 corresponds to the content of steps S601 to S604 in FIG. 6.

The first communication module 10 is a receiver. As shown in FIG. 10, a reception electrode 13 and a GND electrode 24 for human body communication are arranged in the first communication module 10.

The reception electrode 13 is electrically connected to a control unit 14, and a signal detected by the reception electrode 13 is converted into an electrical signal by a reception circuit 28. The control unit 14 demodulates the signal and determines whether or not a received ID is a normal ID. When the control unit 14 has determined that the received ID is the normal ID, the second communication module 40 is specified and the door 74 is unlocked. The operation by the first communication module 10 corresponds to the content of steps S705 to S707 in FIG. 7.

According to this embodiment as described above, first, the first communication module 10 of the above-described first and second embodiments (the second communication module 40 of the third embodiment) (hereinafter, reference numeral in parentheses corresponds to the configuration of the third embodiment) includes the electric field strength measuring unit 32 (62), the transmission output determination unit 18 (48), and the output execution unit 20 (50).

When a transmission signal is output from the first communication module 10 (the second communication module 40) to the second communication module 40 (the first communication module 10), a received electric field strength at the time of no transmission signal is detected. The electric field strength measuring unit 32 (62) measures a noise level of environmental noise from the received electric field strength detected at the time of no signal, and outputs the measurement result to the transmission output determination unit 18 (48).

The transmission output determination unit 18 (48) determines an output level of the transmission signal to be transmitted to the second communication module 40 (the first communication module 10) on the basis of the measured noise level, and outputs the determination result to the output execution unit 20 (50). The output execution unit 20 (50) outputs a transmission signal of the determined output level to the second communication module 40 (the first communication module 10) via the transmission/reception electrode 12 (42).

As described above, since a state in which a transmission signal from the first communication module 10 (the second communication module 40) to the second communication module 40 (the first communication module 10) is absent is a state in which environmental noise received by the human body 80 itself is capable of being specified, it is possible to recognize the environmental noise received by the human body 80 itself when the noise level is measured on the basis of a state in which no transmission signal is present. Consequently, the output level of the transmission signal directed to the second communication module 40 (the first communication module 10) may be determined by considering the noise level. As a result, it contributes to the improvement of true communication performance in communication using the human body 80 as a signal transmission path.

In communication using the human body 80 for the signal transmission path, the human body 80 itself functions as an antenna which picks up environmental noise, and the noise level is particularly increased at the moment when the hand of the human body 80 is in contact with the door knob 76, that is, the transmission/reception electrode 12 of the first communication module 10. However, in this embodiment, it is possible to reliably recognize the environmental noise received by the human body 80 itself since the noise level of the above-described moment is measured.

Since the transmission output determination unit 18 (48) determines the output level of the transmission signal directed to the second communication module 40 (the first communication module 10) by following the measured noise level, it is possible to set the output level of the transmission signal to an optimum magnitude commensurate with the noise level. Consequently, the transmission signal directed to the second communication module 40 (the first communication module 10) is not buried in the environmental noise, and it is possible to prevent communication which does not pass through the human body 80 as the signal transmission path.

Further, not only the output execution unit 20 of the first communication module 10 in the first and second embodiments outputs the transmission signal to the second communication module 40, but also the transmission signal includes information of the measured noise level or the determined output level. Consequently, for example, the first communication module 10 may also use the information for a subsequent determination of the output level or the like, and the second communication module 40 may also use the information for adjustment or the like upon reception/transmission.

In the first and second embodiments, two-way communication is performed between the first communication module 10 and the second communication module 40 mounted on the human body 80. The second communication module 40 mounted on the human body 80 also includes the transmission output determination unit 48 and the output execution unit 50, but the transmission output determination unit 48 determines an output level of a transmission signal to be returned to the first communication module 10 using the information of the noise level measured by the first communication module 10 or the output level determined thereby. Since it is not necessary to measure the noise level in the second communication module 40, it is possible to simplify the configuration or control of the second communication module 40.

The second communication module 40 mounted on the human body 80 may be started using the transmission signal from the first communication module 10 as a trigger, so that power consumption may be reduced. As a result, the battery life of the second communication module 40 is also lengthened.

Further, since the transmission output determination unit 48 of the second communication module 40 of the first and second embodiments determines the output level of the transmission signal directed to the first communication module 10 by following the measured noise level or the determined output level, it is possible to set the output level of the transmission signal to be returned to an optimum magnitude commensurate with the noise level. Even in two-way communication of the communication modules 10 and 40, the transmission signal directed to the first communication module 10 is not buried in the environmental noise, and it is possible to prevent communication which does not pass through the human body 80 as the signal transmission path.

In the first communication module 10 of the second embodiment, the electric field strength measuring unit 32 not only measures the noise level from the received electric field strength at the time of no signal, but also measures the received signal level by the received electric field strength of the transmission signal returned from the second communication module 40. The transmission output determination unit 18 re-determines the output level of the transmission signal to be transmitted to the second communication module 40 on the basis of the former noise level and the latter received signal level.

For example, a high output level is necessary in initial communication when it is possible to re-adjust the output level of the transmission signal directed to the second communication module 40 by considering an actual communication state as described above. However, in the case where a low output level is adequate thereafter, it is possible to avoid the transmission by a useless output level and it is possible to reduce power consumption while improving true communication performance.

The transmission/reception electrodes 12 and 42 are capacitively coupled to the human body 80, thereby receiving or transmitting a signal from or to the human body 80. The GND electrode 24 is capacitively coupled to the GND electrode 54 via the ground which is the air or the floor surface 70. A closed loop is formed by all the electrodes.

Consequently, in an embodiment of the invention as compared to the case using RFID or short-range radio communication, it is possible to connect the employee ID card 82 by the natural action of holding the door knob 76 of the door 74 by the human body 80, omit a troublesome operation of inserting into a reader, and facilitate use. Since the radio is transmitted several meters even in a weak radio wave and is transmitted in all directions, communication information may be easily intercepted. However, in this embodiment, security is guaranteed without external leaking of information from the human body 80 as compared to short-range radio communication or the like. Since a communication distance is short and no radio wave is also emitted, the power consumption of each of the communication modules 10 and 40 is reduced.

Each of the communication modules 10 and 40 uses an electric field generated by voltage application directed to the human body 80, and uses the human body 80 as a signal transmission path. Since a signal of the above-described method is transmitted through clothing or shoes, the transmission/reception electrodes 12 and 42 or the GND electrodes 24 and 54 may perform non-contact communication without making direct contact with the skin of the human body 80. Consequently, the influence of the sweat of the human body 80 or the like on communication is small and general versatility also increases.

The present invention is not limited to the above-described embodiments, and various modifications may be made without departing from the scope of claims.

An example of implementing unlocking of the door 74 has been described in each embodiment. Of course, the present invention is applicable even in the case where it is necessary to continuously authenticate applications, for example, a headphone, a portable music player, and the like, used in a communication distance such as the above-described PAN or BAN.

When the electric field scheme of each embodiment described above is used, the influence of the sweat or the like on communication is small and communication via clothing is possible, so that general versatility also increases. An electric current scheme may be used in which a human body serves as a signal line and a reference line.

Even in any of the cases described above, it is possible to recognize environmental noise received by a human body and achieve the improvement of true communication performance.

It should be understood by those skilled in the art that various modifications, combinations, sub-combinations and alterations may occur depending on design requirements and other factors insofar as they are within the scope of the appended claims of the equivalents thereof.

What is claimed is:

1. A communication device for communicating with an external device using a human body as a signal transmission path, comprising:
    an electric field strength measuring unit configured to measure a noise level from a detected received electric field strength at the time of no signal after the received electric field strength is detected by the communication device when a transmission signal to be output to the external device is absent;
    a transmission output determination unit configured to determine an output level of the transmission signal to be transmitted to the external device on the basis of the measured noise level; and
    an output execution unit configured to output a transmission signal of the determined output level to the external device.

2. The communication device according to claim 1,
    wherein the received electric field strength at the time of no signal is a received electric field strength of the moment when the human body is in contact with the external device in a state in which the transmission signal directed to the external device is not started up.

3. The communication device according to claim 1,
    wherein the transmission output determination unit determines a high output level when the measured noise level is high, and determines a low output level when the measured noise level is low.

4. The communication device according to claims 1,
wherein the output execution unit outputs the transmission signal including information of the measured noise level or the determined output level to the external device.

5. The communication device according to claim 4,
wherein the external device is a communication module mounted on the human body), and
wherein the mounted communication module includes:
a transmission output determination unit configured to determine an output level of a transmission signal to be returned to the communication device on the basis of the information of the measured noise level or the determined output level; and
an output execution unit configured to output a transmission signal of the determined output level to the communication device.

6. The communication device according to claim 5,
wherein the transmission output determination unit determines a high output level when the measured noise level or the determined output level is high, and determines a low output level when the measured noise level or the determined output level is low.

7. The communication device according to claims 1,
wherein a received electric field strength of a transmission signal returned from the external device is further detected,
wherein the electric field strength measuring unit measures a received signal level from the detected received electric field strength of the transmission signal, and
wherein the transmission output determination unit re-determines an output level of a transmission signal to be transmitted to the external device on the basis of the measured received signal and a noise level before or after the received signal is detected.

8. A communication method for communication between a first communication module and a second communication module using a human body as a signal transmission path, comprising:
detecting, by the first communication module, a received electric field strength at the time of no signal as the moment when the human body is in contact with the second communication module in a state in which a transmission signal is not started up when the transmission signal is output to the second communication module;
measuring, by the first communication module, a noise level from the detected received electric field strength at the time of no signal;
following, by the first communication module, a high/low state of the measured noise level and determining an output level of a transmission signal to be transmitted to the second communication module;
outputting, by the first communication module, a transmission signal of the determined output level to the second communication module along with information of the measured noise level or the determined output level;
following, by the second communication module, a high/low state of the information of the measured noise level or the determined output level and determining an output level of a transmission signal to be returned to the first communication module; and
outputting, by the second communication module, a transmission signal of the determined output level to the first communication module.

* * * * *